C. M. Lightner.
Corn Harvester.

No. 56,236. Patented July 10, 1866.

Witnesses.
C. H. Ellerbeck
P. E. Dodge

Inventor.
C. M. Lightner.
By M. E. Dodge
Attorney.

UNITED STATES PATENT OFFICE.

C. M. LIGHTNER, OF HARRISBURG, PENNSYLVANIA.

IMPROVEMENT IN CORN-HARVESTERS.

Specification forming part of Letters Patent No. 56,236, dated July 10, 1866.

*To all whom it may concern:*

Be it known that I, C. M. LIGHTNER, of Harrisburg, in the county of Dauphin and State of Pennsylvania, have invented certain new and useful Improvements in Corn-Harvesters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists of a series of revolving knives operated by the driving-wheels of a two-wheeled machine, arranged to operate in connection with stationary knives so mounted and arranged as to cut two rows of standing corn as it is drawn along.

It also consists in a pivoted frame for receiving the corn as cut and depositing it in bundles ready for binding.

Figure 2:
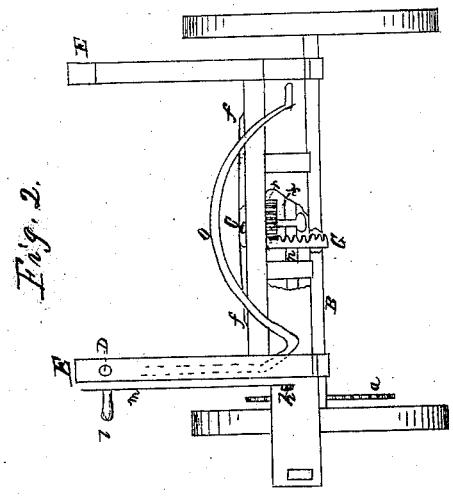
Figure 1:
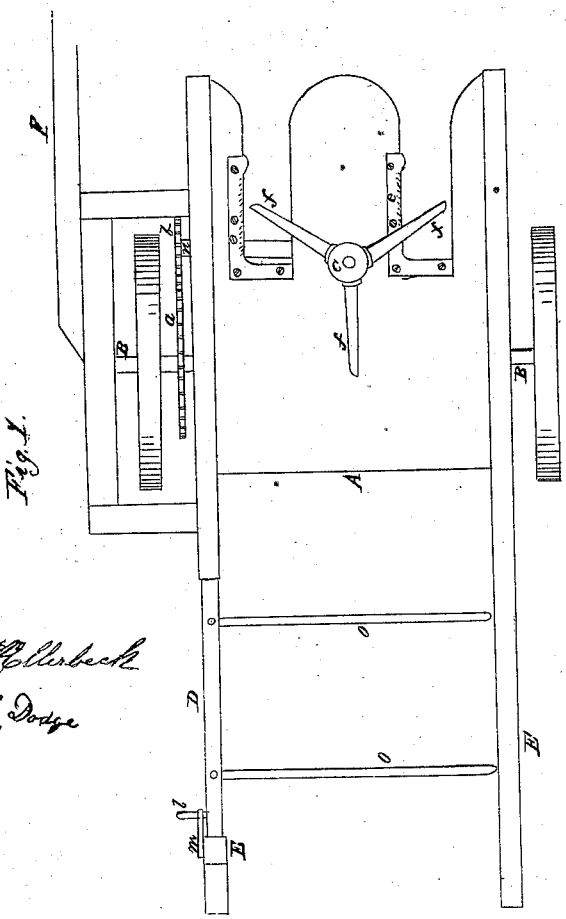

A represents a platform mounted upon two wheels attached to an axle, B, one of the wheels being loose upon the axle to allow it to turn about. To the axle B is secured a spur-wheel, $a$, which gears into a pinion, $b$, secured to another shaft, $n$, as shown in Fig. 1. To this shaft $n$, underneath the platform, is attached a crown-wheel, G, arranged to gear into a pinion, $r$, secured to a vertical shaft, $x$, as shown in Fig. 2. This shaft $x$ extends up through the platform, and has attached to its upper end a hub, C, to which are secured three radially-projecting knives, $f$.

At the front end the platform A is cut away, as shown in Fig. 1, forming two openings at such a distance apart as to permit two rows of corn to enter the openings as the machine is drawn along, thereby bringing the corn within reach of the revolving knives $f$. To the edge of the platform, at the side of the openings, knives $e$ are secured, as shown in Fig. 1. If desired, these knives $e$ may be provided with sickle-edges to prevent the stalks from slipping away from the revolving knives $f$, especially on the right-hand side.

If desired, the blades $f$ may be curved instead of straight, and they may also be provided with sickle-edges.

E represents a railing or frame built up on each side of the machine to prevent the stalks from falling off when cut, and in rear of the platform A two cross-bars, $o$, are placed, to receive the corn as it falls after being cut. These bars $o$ are bent, as shown in Fig. 2, and are secured at one end to a bar, D, which is pivoted at each end to the frame E at one side of the machine. A handle or lever, $l$, projects laterally from the bar D, and a hook, $m$, which has its lower end pivoted to the frame at $h$, as shown in Fig. 2, engages over this lever $l$, and thus holds the bars $o$ in position.

When the bars $o$ have received a sufficient quantity of corn to form a bundle the hook $m$ is disengaged, which lets the bars $o$ drop down and deposit the corn upon the ground, after which the bars are again secured in position by the hook $m$.

F represents the tongue, which is attached to one side of the machine, so as to enable the team to travel alongside of the standing corn and bring the machine in proper position to cause the adjoining rows to enter the openings at the front of the platform.

Having thus described my invention, what I claim is—

1. The platform provided with openings, as shown, and having the knives $e$ attached, in combination with the centrally-located revolving knives $f$, arranged and operating as shown and described.

2. The combination and arrangement of the pivoted bar D, having the bent bars $o$ attached, as shown, with the hook $m$, all arranged to operate as set forth.

C. M. LIGHTNER.

Witnesses:
EDM. F. BROWN,
W. C. DODGE.